(12) United States Patent
Huston, III et al.

(10) Patent No.: US 10,904,203 B2
(45) Date of Patent: Jan. 26, 2021

(54) AUGMENTING NETWORK FLOW WITH PASSIVE DNS INFORMATION

(71) Applicant: Arbor Networks, Inc., Burlington, MA (US)

(72) Inventors: Lawrence B. Huston, III, Ann Arbor, MI (US); James E. Winquist, Ypsilanti, MI (US); Alex Levine, Chelsea, MI (US); Ronald G. Hay, Ann Arbor, MI (US); Brett Higgins, Ann Arbor, MI (US); Andrew D. Mortensen, Ann Arbor, MI (US); William M. Northway, Jr., Ann Arbor, MI (US); Eric Jackson, Ann Arbor, MI (US)

(73) Assignee: Arbor Networks, Inc., Westford, MA (US)

( * ) Notice: Subject to any disclaimer, the term of this patent is extended or adjusted under 35 U.S.C. 154(b) by 260 days.

(21) Appl. No.: 15/261,474

(22) Filed: Sep. 9, 2016

(65) Prior Publication Data

US 2018/0077110 A1    Mar. 15, 2018

(51) Int. Cl.
*H04L 29/12* (2006.01)
*H04L 12/26* (2006.01)

(52) U.S. Cl.
CPC ........ *H04L 61/1511* (2013.01); *H04L 43/028* (2013.01); *H04L 43/06* (2013.01); *H04L 43/18* (2013.01)

(58) Field of Classification Search
CPC ..... H04L 61/1511; H04L 43/08; H04L 43/062
USPC .......................................................... 709/224
See application file for complete search history.

(56) References Cited

U.S. PATENT DOCUMENTS

| | | | |
|---|---|---|---|
| 8,819,227 B1 * | 8/2014 | Keralapura | H04L 45/38 709/203 |
| 8,879,415 B2 | 11/2014 | Labovitz et al. | |
| 9,967,232 B1 * | 5/2018 | Royt | H04L 61/1511 |
| 2009/0154363 A1 * | 6/2009 | Stephens | H04L 43/062 370/241 |
| 2013/0290521 A1 * | 10/2013 | Labovitz | H04L 43/00 709/224 |
| 2015/0195245 A1 * | 7/2015 | Batz | H04L 61/1511 709/245 |
| 2015/0215177 A1 * | 7/2015 | Pietrowicz | H04L 43/106 370/230 |
| 2017/0208077 A1 * | 7/2017 | Freedman | G06F 16/24568 |
| 2017/0353486 A1 * | 12/2017 | Mironchyk | H04L 43/08 |

* cited by examiner

*Primary Examiner* — Umar Cheema
*Assistant Examiner* — James Ross Hollister
(74) *Attorney, Agent, or Firm* — Locke Lord LLP; Scott D. Wofsy; Christopher J. Capelli (57) ABSTRACT

A method for encoding domain name information into flow records includes receiving a flow record. The flow record includes initial network flow information in a standard flow record format including at least a source address and a destination address. Domain name information associated with each of the source address and destination address is retrieved from a database. The domain name information is encoded into the received flow record while maintaining the initial network flow information to yield an enhanced flow record.

18 Claims, 5 Drawing Sheets

| 0 | 1 | 2 | 3 |
|---|---|---|---|
| Netflow Version || Record Count ||
| System Uptime ||||
| Unix Seconds (timestamp) ||||
| Sequence Number ||||
| Source ID ||||

FIG. 5

| 0 | 1 | 2 | 3 |
|---|---|---|---|
| 220 (Template ID) ||||
| 1430 (total flowset length) ||||
| 192.168.1.27 (src IP) ||||
| 192.168.1.28 (dest IP) ||||
| 32156 (src port) ||||
| 80 (dest port) ||||
| 6 (protocol TCP) ||||
| host1.engineering.example.com (source name) ||||
| host2.engineering.example.com (destination name) ||||
| 148573 (bytes) ||||
| 953 (packets) ||||
| 198.168.5.43 (src IP of flow record #2) ||||
| • ||||
| • ||||
| • ||||

FIG. 6

AUGMENTING NETWORK FLOW WITH PASSIVE DNS INFORMATION

FIELD OF THE INVENTION

Embodiments of the present invention relate generally to the processing of network packets, and specifically to augmenting network flow with passive Domain Name System (DNS) information.

BACKGROUND OF THE INVENTION

Various network management systems are used to monitor networks. These systems can exist as stand-alone, dedicated systems or be embedded in network communications devices such as routers and switches. Other tools include special-purpose systems, such as firewalls and other network security devices that are typically used to manage the communications at boundaries between the networks.

One source of information for monitoring networks is flow information. A "flow" is defined as "a unidirectional sequence of packets with some common properties that pass through a network device." Internet Engineering Task Force, RFC 3954. More recently, another type of network metadata, referred to by various vendors as NetFlow, jFlow, sFlow, etc., has also been introduced as a part of standard network traffic (hereafter generally referred to as "flow records".) Flow records are often generated by the network devices. These are often digested information concerning individual network flows or groups of network flows sharing some common characteristic(s). The flow records often include, for example, internet protocol (IP) addresses, packet and byte counts, timestamps, Type of Service (ToS), application ports, input and output interfaces, to list a few examples. This information is available from Netflow technology, for example. Generally, computer network devices that generate flow records include, for example, routers, switches, firewalls, and hubs. In other examples, packet scanners/analyzers (e.g., Arbor Networks PEAKFLOW® threat management system (TMS)) are used. Flows may be collected and exported for analysis. Flow analysis is a central component of large-scale network management and service systems.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for encoding domain name information into flow records is provided. The method includes receiving a flow record. The flow record includes initial network flow information in a standard flow record format including at least a source address and a destination address. Domain name information associated with each of the source address and destination address is retrieved from a database. The domain name information is encoded into the received flow record while maintaining the initial network flow information to yield an enhanced flow record.

In another aspect, a monitoring system includes a monitored network consisting of a plurality of devices. The monitoring system further includes a database for storing DNS information. The monitoring system also includes one or more network monitoring devices communicatively coupled to the monitored network and to the database. The monitoring device(s) are configured and operable to receive a flow record. Domain name information associated with each of the source address and destination address is retrieved from a database by the monitoring device(s). The domain name information is encoded, by the monitoring device(s), with the received flow record while maintaining the initial network flow information to yield an enhanced flow record.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

For many computer networks, the standard flow information that is typically transmitted from network devices is somewhat limited. It is desirable in computer networks to add intelligence to standard network flow monitoring to implement new types of detection and analysis based on flow data.

Various embodiments of the present invention can be used to facilitate the creation of scalable flow monitoring solutions. The embodiments of the invention also demonstrate that there can be a reasonably low overhead for this lightweight approach.

An embodiment of the present invention takes in standard flow records exported from network devices such as routers, switches, firewalls, hubs, etc., and annotates the flow with passive DNS information. This information is derived from a number of sources, including, for example, a passive domain name system database. These annotations add DNS information to the flow data, and can be used to perform further data flow analysis that is not available without the DNS information. The annotated flow is then resent to a configurable set of destinations using standard flow formatting. For example, Netflow v9 format with user defined fields or IPFIX format with enterprise specific information elements may be used in some implementations. This embodiment allows the enhanced flow record to be processed and the enhanced data flow information to be used by other flow analysis tools and existing flow analysis infrastructure.

Various data sources may be used to annotate the flow. A "data source," as used herein, may include any entity initiating or providing data through a data flow. In some embodiments, a single data flow may have multiple collaborating data sources.

Advantages over existing systems include real-time data gathering on the state of existing network traffic flows and real-time mapping of domain traffic directly at the flow level. Of note, DNS data collection and analysis of existing systems are performed after identifying traffic points of interest, often accompanied by long delays between the sending of the original flow information from the network devices and the availability of the additional DNS information generated by various network tools. Thus, performing mapping of domain traffic at the flow level affords number of advantages.

First, many existing systems fail to exploit the potential value of the fully qualified domain name, which could provide a natural level of aggregation for reporting purposes. Some traffic to domains can be distributed across a wide range of IP addresses (e.g., in content delivery systems). If the traffic is widely distributed then it might not be included in the top talker report, unless the administrator identifies the range of IP addresses that are related and groups them together manually. Performing aggregation by the fully qualified domain name automatically groups all related traffic without any additional manual configuration.

Second, performing mapping of domain traffic at the flow level enables identification of higher-level growth trends in the observed network traffic characteristics and classification of the identified higher-level trends while the overall traffic volume is still small. This allows the monitoring system to detect small but rapidly growing traffic trends before they become large.

Third, by resending enhanced flow records to a configurable set of destinations, the same data are reused multiple times in different network monitors for different applications.

In general, according to one aspect, embodiments of the present invention feature a method of processing network flow information. The method comprises receiving a flow record exported from a network device element and augmenting the flow record with passive DNS information.

In a common implementation, the network device element is any of: a server, a router, a switch, a hub, a firewall, a packet scanner/analyzer, or any other computing device. In addition, the method includes sending the enhanced flow record to a configurable set of destinations using customized flow formatting.

The additional information is derived, at least in part, from a passive DNS data source, in one example. The source and destination addresses identified in the received flow record are looked up using the passive DNS information data source and the associated domain names are augmented to the flow record.

In general, according to another aspect, the embodiments of the invention feature a flow augmentation module. This flow augmentation module comprises a flow analysis engine which receives flow record from a network device and which selects information from at least one DNS source to be added to the flow record. A flow encoding and distribution engine is provided that augments the flow record with the selected DNS information to create an enhanced flow record, and that transmits the enhanced flow record to a configurable set of destinations comprising at least one of an additional flow augmentation module and a flow consumer. An enhanced flow reporting engine is configured to provide the enhanced flow information responsive to users' requests.

Figure 1:
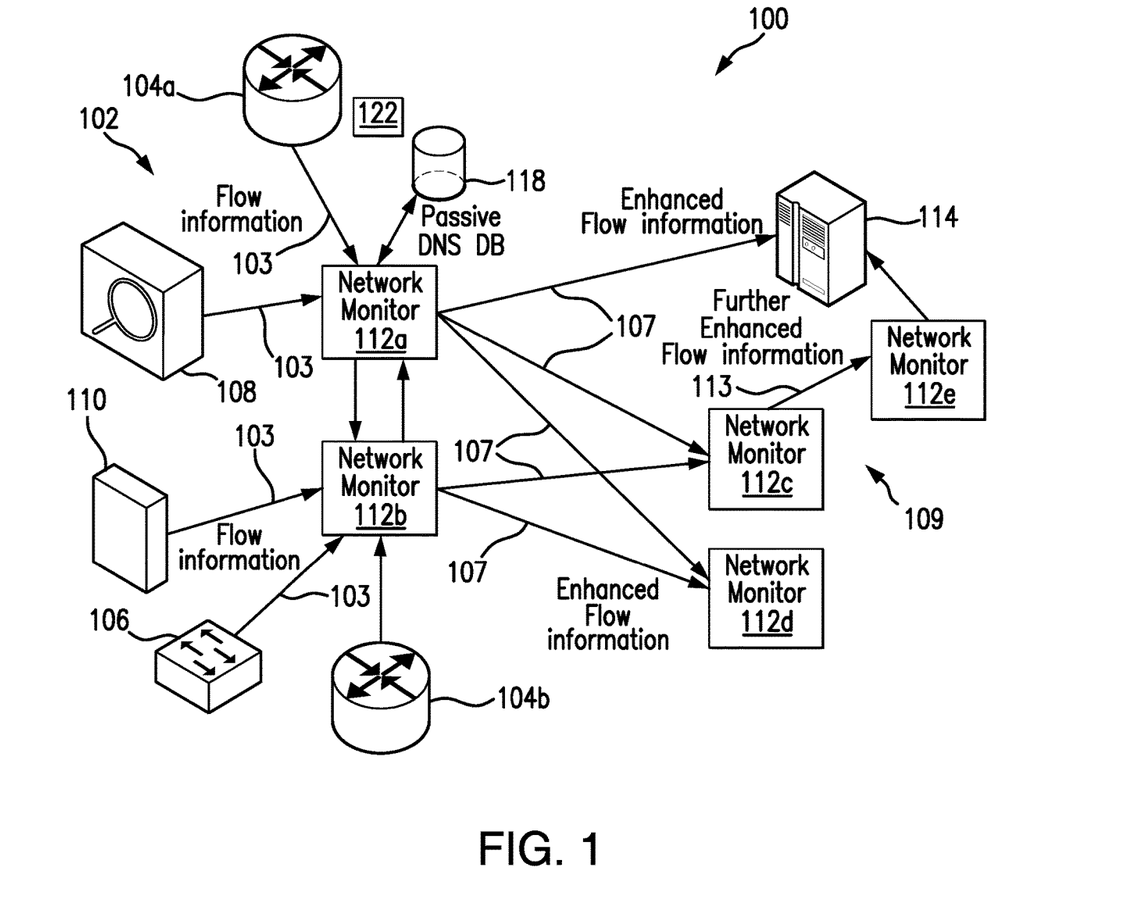
FIG. 1 is a block diagram of the inventive flow augmentation system deployed within a network.

Turning now descriptively to the drawings, in which similar reference characters denote similar elements throughout the several views, FIG. 1 illustrates a block diagram of a flow augmentation system 100 deployed within a network 102 according to the principles of the present invention.

In more detail, network communication devices such as routers 104a, 104b and/or switches 106 collect flow information from the packet information that is transmitted through the network 102 between other network communications devices, network nodes, and host computers. Flow information is also collected, in some examples from packet monitors or taps 108 that are installed usually solely to monitor packet traffic. A non-limiting example here is the Netflow Analyzer offered by Cisco Systems, Inc. Other exemplary sources of flow information include network security devices, e.g., firewalls 110, which apply security policies and monitor for malicious code/packets.

The flow information 103 from these collectors is forwarded to one or more network monitors 112*a*, 112*b*. In some examples, these network monitors 112*a*, 112*b* and other network monitors in the network, 112*c*, 112*d*, 112*e*, function in a peer-to-peer relationship. Such a relationship is used to provide redundancy such that failure of any network monitor does not undermine the operation of other monitors. On the other hand, in some examples, master-slave relationships are defined in which one of the monitors 112 functions as master to other slave monitors. In still other examples, a separate monitor controller 114 is deployed.

Primarily, the network monitors 112 are used to monitor network activity based on the received flow information 103. In a general sense, the network monitors 112*a*, 112*b* analyze the flow to determine whether the network activity is in compliance with policies for the network 102. Such policies include network management policies related to traffic levels, for example, and network security policies related to maintaining the security of the network and protecting it against attacks, such as denial of service attacks, viruses, or worms.

According to embodiments of the invention, the network monitors 112*a*, 112*b* further augment the flow information with additional information derived from passive DNS traffic analysis. As shown in FIG. 1, the network 102 may further include a passive DNS database 118. It should be noted that data stored in the passive DNS database 118 may be either internally-generated or third party-sourced, in various embodiments.

In addition to storing the historical information collected by various DNS servers and passive DNS collectors 122, the passive DNS database 118 may also store additional information, such as a list or multiple lists of known malicious domain names. These lists of known malicious domain names may be created or updated by running known malware samples in a controlled environment, and then classifying all the domain names contacted by the malware samples that do not match a pre-compiled white list (e.g., a large list of popular, legitimate domain names from Alexa-.com). In addition, domain names, which do not match a pre-compiled white list, may be extracted from spam emails collected using a spam-trap.

The network monitors 112*a*, 112*b* may utilize the information stored in the passive DNS database 118 to augment the flow information 103 with the DNS information. Additional information about how the network monitors 112 are utilized is described below.

The network monitors 112*a*, 112*b* augment the flow information and send the enhanced flow information 107 to each other and various flow consumers 109, which include additional flow augmenting network monitors 112*c*, 112*d* and also possibly the controller 114.

The additional flow augmentation modules 112*c*, for example, output one or more further enhanced flows 113 to further flow consumers and/or augmentation modules 112*e*, in one example.

Figure 2:
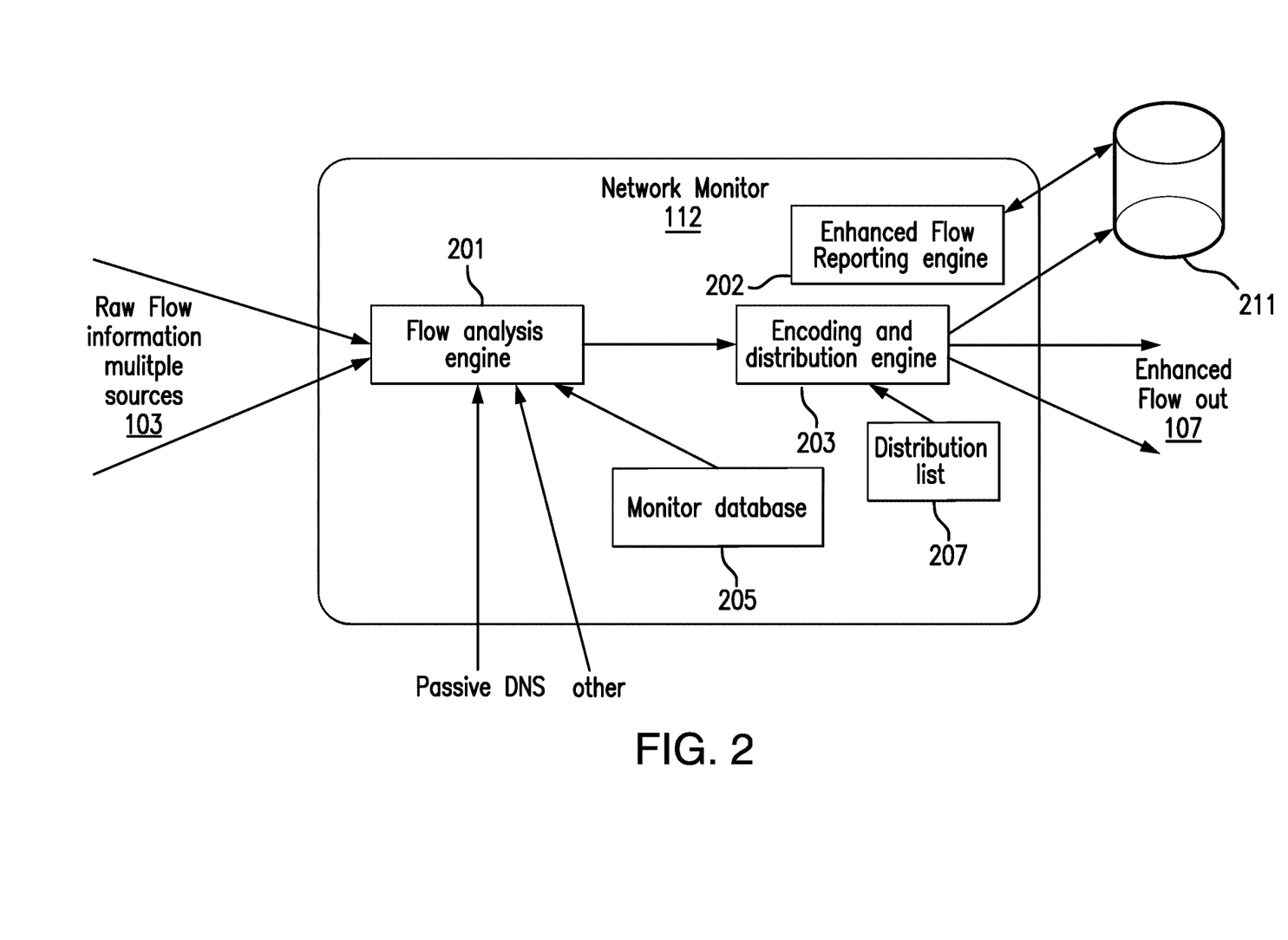
FIG. 2 is a schematic diagram of the network monitor, according to an embodiment of the present invention.

FIG. 2 is a schematic diagram of the flow augmenting network monitors 112 of FIG. 1. Here the monitor 112 is logically broken down into three functions: a flow analysis engine 201, a flow encoding and distribution engine 203 and an enhanced flow reporting engine 202. Although shown separately, these three functions are often combined into a single operating module, implemented in hardware, software, or a combination thereof.

When the flow data 103 are received from the network devices 106, 108, 110, the network monitor 112 applies available policies to the flow and analyzes the flow in terms of passive DNS information, and other information received from other data sources including one or more internally maintained databases 205.

The enhanced flow is then encoded and distributed by the distribution engine 203 to various consumers of the flow information. A distribution list 207 identifies the entities that will receive the enhanced flow information. At least in some embodiments, the distributed enhanced flow information may be stored in an enhanced flow information database 211.

According to an embodiment of the present invention, the enhanced flow reporting engine 202 may be configured to provide reporting functionally related to the enhanced flow information responsive to users' requests. For example, the enhanced flow reporting engine 202 may provide augmented network flow information of interest broken down by domain names. Additional information about the enhanced flow reporting engine 202 is provided below.

Figure 3:
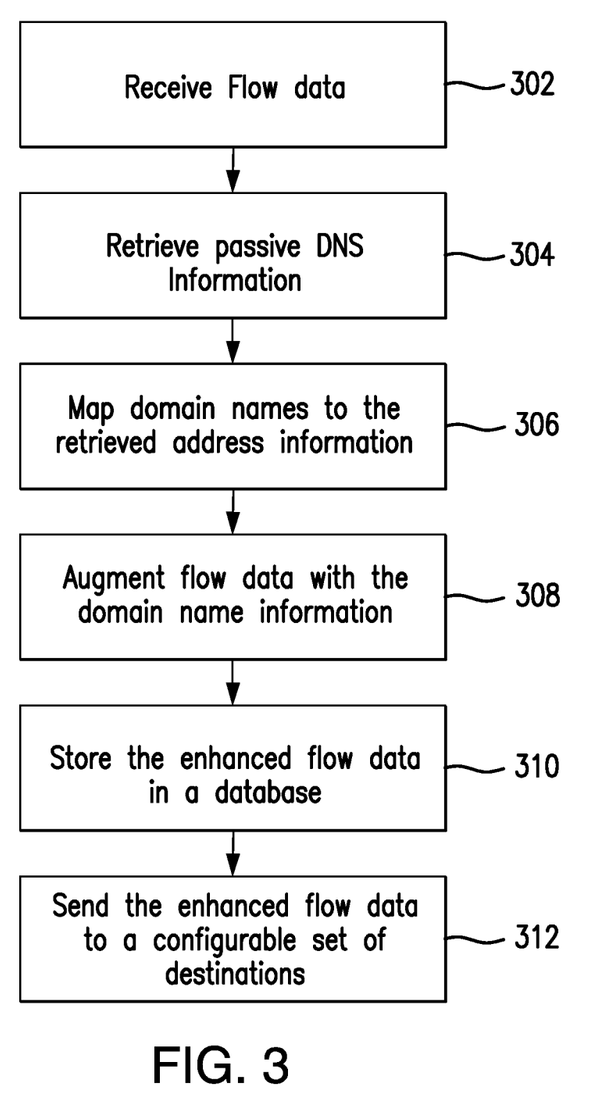
FIG. 3 is a flowchart showing the operation of the flow analysis engine and the encoding and distribution engine of the network monitor, according to an embodiment of the present invention.
Figure 4:
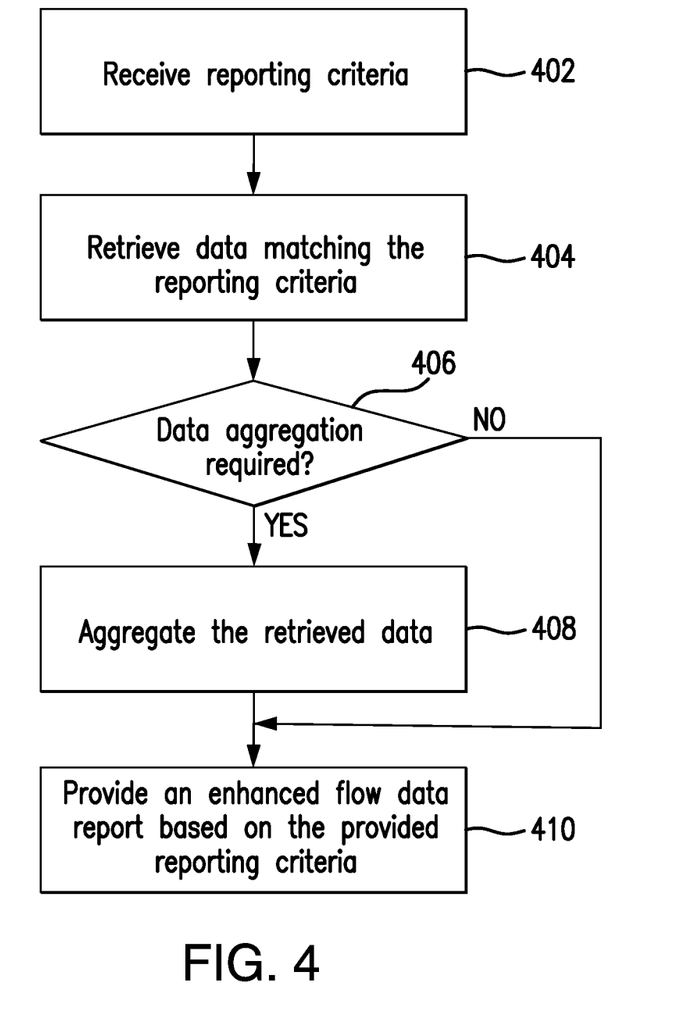
FIG. 4 is a flowchart showing the operation of the enhanced flow reporting engine of the network monitor, according to an embodiment of the present invention.

FIG. 3 is a flowchart showing the operation of the flow analysis engine 201 and the encoding and distribution engine 203 of the network monitor 112 and FIG. 4 is a flowchart showing the operation of the enhanced flow reporting engine 202 of the network monitor 112 according to an embodiment of the present invention. Before turning to descriptions of FIGS. 3 and 4, it is noted that the flow diagrams in FIGS. 3 and 4 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

Starting with FIG. 3, in step 302, flow data are received by the flow analysis engine 201. This received data comprises, in examples, standard flow records, for example from network communication devices such as routers 104 and switch 106 or other network devices 108, 110.

In step 304, if passive DNS information is available, the flow analysis engine 201 retrieves a list of names related to the IP address(es) extracted the received flow records from the passive DNS database 118.

In step 306, the flow analysis engine 201 maps the retrieved domain name information to the source and destination address information contained in the received standard flow records. In one embodiment, the standard flow record comprises the 5-tuple association of values including source IP address, source port number, destination IP address, destination port number, and protocol. It should be noted that some DNS servers could store multiple IP address entries for a host, and deliver successive mappings based on a round-robin scheme. In this case, the flow analysis engine 201 maps a host name to one of many IP addresses. In other words, in step 306, the flow analysis engine 201 generates a mapping that associates the received standard flow records with corresponding domain name information and sends both the mappings and the standard flow records to the encoding and distribution engine 203. At least in some embodiments, the flow analysis engine 201 may store the mapped domain names and addresses as the domain name information in the passive DNS database 118.

In step 308, if domain name information is received, then the encoding and distribution engine 203 preferably encodes the domain name information in the associated flow record to yield an enhanced flow record, while maintaining the initial network flow information contained in the received standard flow records. In other examples, the standard flow information may additionally be augmented with policy information. For example, the enhanced flow record may describe whether the flow matches a configured network traffic policy signature, or not, and may identify that signature. Signature detection includes flags that indicate if the flow matches a known worm or denial of service (DOS) attack signature, or other signatures either auto-learned by the system or configured by the user. Generally, any given flow may be augmented by any combination of the above passive DNS information. The DNS information chosen for augmentation by the encoding and distribution engine 203 can be based on user configuration or automatically determined by the system based on the domain name data that are available for the flow.

According to an embodiment of the present invention, in step 310, the encoding and distribution engine 203 may store the augmented data flow record in a centralized enhanced flow record repository 211 (shown in FIG. 2). The repository 211 may be a conventional, fault tolerant, relational, scalable, secure database such as Oracle or Sybase. Relational databases are an extension of a flat file. Relational databases consist of a series of related tables. The tables are interconnected via a key field. Alternatively, the enhanced flow record repository 211 may be implemented using various standard data-structures, such as an array, hash, (linked) list, struct, structured text file (e.g., XML), table, and/or the like. Also, the repository 211 may be implemented as a mix of data structures, objects, and relational structures. Repositories 211 maintained by each network monitor 112 may be consolidated and/or distributed in countless variations through standard data processing techniques. Portions of repositories 211, e.g., tables, may be exported and/or imported and thus decentralized and/or integrated.

In step 312, the augmented flow records may be sent by the encoding and distribution engine 203 to a configurable set of destinations that often make use of both the original flow information and the enhanced flow information to do useful work, either by reporting on the flow information, detecting network problems, generating alerts, or other analysis.

This augmentation and flow records redistribution is preferably performed in real-time. The augmented flow records further preferably use a standard flow representation method to encode and send the augmented DNS information, such as the industry-standard NetFlow version 9 format, which is maintained by Cisco Systems Inc. and which has been implemented by Juniper. Augmented flow records can thus be processed by both standard flow analysis tools as well as flow analyzers enhanced to make use of the additional domain name information.

In one embodiment, the packets include the augmented flow information implemented using Netflow. According to one implementation, the encoding and distribution engine 203 adds new "field type definitions" and populates these new fields with the retrieved DNS information. More specifically, Netflow (version 9) information may be sent in packets that contain header information and then one or more enhanced flow records. All version 9 flow packets (including augmented flow packets) preferably use a standard header format, which is defined by the Netflow v9, in one implementation.

Figure 5:
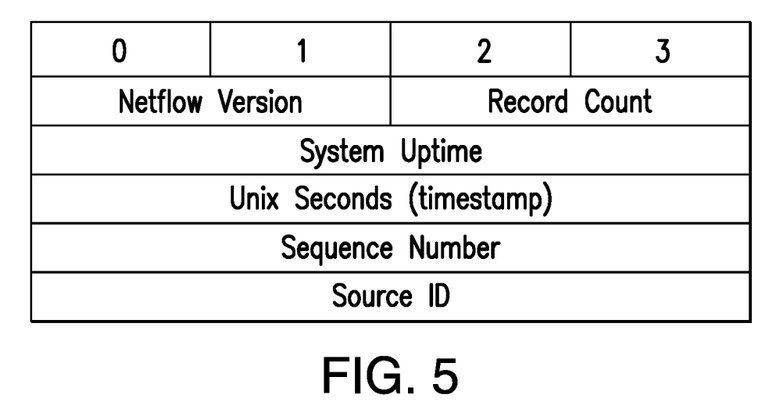
FIG. 5 is a schematic diagram illustrating a packet for transporting flow information according to an embodiment of the present invention.

In more detail, as shown in FIG. 5, the packet headers include the protocol (Netflow) version, record count, system uptime, a time stamp, sequence number and source identification.

According to an embodiment of the present invention, the content and format of these records is defined by a Netflow v9 template, which may be sent periodically by the flow sources using the Template FlowSet packet format, for example. This is a standard packet format for NetFlow v9. Each template sent by a flow source is given a unique ID, which must be placed in the FlowSet Template ID field of a packet, so that the receiver can know how to decode the received flow records.

The template defines which data fields are present in each flow record and in which order, what values represent, and what size values are. Some exemplary field types that might be defined in a standard NetFlow v9 Template are illustrated in Table (1) below:

TABLE 1

| Field Type | Field ID | Field Length | Description |
| --- | --- | --- | --- |
| IPV4 SRC ADDR | 8 | 4 | IPv4 Source Address |
| IPV4 DST ADDR | 12 | 4 | IPv4 Destination Address |
| L4 SRC PORT | 7 | 2 | TCP/UDP source port number |
| L4 DST PORT | 11 | 2 | TCP/UDP dest. port number |
| PROTOCOL | 4 | 1 | IP Protocol |
| SRC HOST FQDN | 10 | 16 | FQDN of source host |
| DST HOST FQDN | 14 | 16 | FQDN of destination host |

Figure 6:
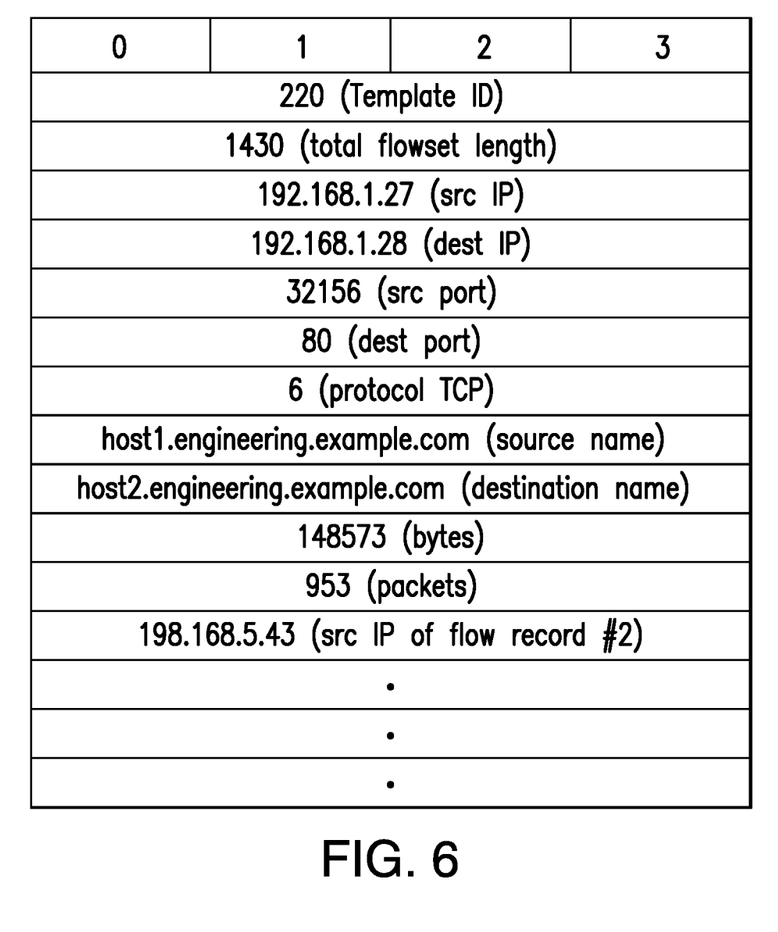
FIG. 6 is a schematic diagram illustrating enhanced flow information in a packet, according to an embodiment of the present invention.

Referring now to FIG. 6, based on the above template, FIG. 6 shows a sample packet containing an enhanced flow record. (For readability, the size of the fields has been rounded up to 4 bytes, even though in actuality they may use different sizes).

According to one embodiment, the encoding and distribution engine 203 of the network monitor 112 adds new field type definitions to represent the new DNS information being added to the augmented flow records. The encoding and distribution engine 203 sends out an annotated flow template using the standard flow template format and incorporating these new field types. The encoding and distribution engine 203 then sends annotated flows using the standard flow format and incorporating the new DNS information defined by the template definition.

As noted above, network monitors 112 may be further configured and operable to analyze the plurality of the enhanced flow records stored in the flow record repository 211 according to a user specified criteria and to provide reporting functionality based on the performed analysis. FIG. 4 is a flowchart showing the operation of the enhanced flow reporting engine 202 of the network monitor 112 according to an embodiment of the present invention.

In step 402, a user interface component (e.g. a graphical user interface (GUI)) of the flow reporting engine 202 receives, from a user, a set of selectable reporting criteria, which the flow reporting engine 202 uses to select specific enhanced flow records meeting such criteria. In one example, a user may be interested in identifying particular domains that are top sources of observed network traffic growth. As another example, a user can interact with the user interface component to define traffic of interest, for example, by selecting the domains, defining one or more regular expressions matching on domains or by specifying a collection of network resources or services. As yet another example, users may utilize the reporting criteria to ask the flow reporting engine 202 to monitor growth of respective traffic to domains over time.

In step 404, the flow reporting engine 202 retrieves data matching the user-specified reporting criteria from the enhanced flow record repository 211.

In step 406, the flow reporting engine 202 determines whether data aggregation is required based on the specified criteria. Such aggregation may be required if network traffic is distributed across a wide range of IP addresses. Generally, DNS names are structured in a way that allows flexibility on matching the traffic. In some embodiments, two forms of DNS service may be supported: an Internet-facing DNS service that allows the rest of the world to resolve host names to Internet-allocated IP addresses, and an internal DNS service that resolves host names to internal network addresses. Continuing with the example shown in FIG. 6, an enhanced flow record may contain "host1.engineering.example.com" as FQDN of the source host and "host 2.engineering.example.com" as FQDN of the destination host. By using FQDN, enhanced flow record information can be aggregated and tabular results presented by grouping data on a single host (or collection of hosts sharing the same name). If the reporting criteria included one or more domain name suffix strings, such as "engineering.example.com", then the flow reporting engine 202 should aggregate and filter the retrieved domain name information matching this exemplary suffix string, for example. As yet another example, the flow reporting engine 202 may need to aggregate and tabulate results for all records associated with the "example.com" registered domain, which would correspond to all network traffic related to the company.

In response to determining that data aggregation is required (decision block 406, "Yes" branch), the flow reporting engine 202 preferably aggregates the respective enhanced flow records in step 408.

Responsive to a determination that the aggregation is not required (decision block 406, "no" branch), or after performing the data aggregation, in step 410, the flow reporting engine 202 generates a report and provides results for all enhanced data flow records matching the criteria. For example, if the user requested monitoring growth of traffic to domains over time, the report generated in step 410 may identify fast growing sources of traffic that may lead to the worsening traffic issues in the future. This enables users, for example, to detect new attacks well before they become a significant problem.

In summary, various embodiments of the present invention disclose a novel approach to augment network flow records with passive DNS information. The disclosed approach provides a number of advantages. One benefit of the above-described flow augmentation approach is that all standard flow template fields can now be incorporated into augmented flow records, and then additional template fields added to provide arbitrary DNS information. When the flow is re-exported with the additional DNS information, the ability of existing flow analysis software to decode and read the standard flow fields is not impacted. On the other hand, a scalable and flexible way to support new analysis software is provided, which can make use of both the standard and new flow annotation fields, from the same NetFlow v9 packet. As yet another advantage, providing information breakdowns by domains can improve understanding on how the network is being used. Monitoring growth of domains enables identification of new popular applications and could indicate new trends that have a potential of affecting the growth and management of the network.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for encoding domain name information in flow records by a network monitoring device coupled to a monitored network comprising a plurality of network devices, the method comprising:
   receiving a selectable set of flow criteria from a user via a graphical user interface (GUI) specifying flow information to be encoded in received flow records wherein the selectable set of criteria includes identifying network traffic growth of at least one identified domain over a specified time period;

receiving a flow record in a flow analysis engine of the network monitoring device configured to receive standard flow records from network devices and identify map domain name information to source and destination address information contained in received standard flow records, the flow record including initial network flow information in a flow record format comprising at least a source address and a destination address;

retrieving domain name information associated with each of the source address and destination address from a database;

retrieving information responsive to the user selected set of flow criteria;

retrieving policy information from a database associated with the received flow record;

encoding the domain name information, retrieved information responsive to the user selected set of flow criteria and retrieved policy information in an encoding and distribution engine of the network monitoring device for encoding the received standard flow records with the identified map domain information and retrieved policy information in the received flow record while maintaining the initial network flow information to yield an enhanced flow record; and distributing the received flow record having the encoded domain name information and policy information to entries identified in a distribution list database of the network monitoring device.

2. The method as recited in claim 1, wherein the retrieved domain name information comprises one or more fully qualified domain names.

3. The method as recited in claim 1, wherein the enhanced flow record is a flow record following customized Netflow format.

4. The method as recited in claim 1, wherein the domain name information includes a domain name suffix string and wherein retrieving the domain name information comprises filtering the retrieved domain name information based on one or more domain name suffix strings.

5. The method as recited in claim 4, further comprising analyzing a plurality of the enhanced flow records stored in the flow record repository according to a user specified criteria.

6. The method as recited in claim 1, further comprising analyzing a plurality of the enhanced flow records stored in the flow record repository to identify one or more domain names associated with sources of network traffic growth.

7. The method as recited in claim 5, wherein the user specified criteria is associated with a user-specified collection of network resources or services.

8. The method as recited in claim 1, wherein the enhanced flow record is distributed to one or more network devices identified in a distribution list.

9. The method as recited in claim 5, wherein analyzing the plurality of the enhanced flow records further comprises aggregating two or more of the enhanced flow records based on one or more domain name suffix strings.

10. A computer network monitoring system coupled to a monitored network comprising a plurality of network devices comprising:
 a database for storing domain name system (DNS) information; and
 one or more network monitoring devices communicatively coupled to the monitored network and to the database, at least one network monitoring device including:
  i. a flow analysis engine configured to receive standard flow records from network devices and identify map domain name information to source and destination address information contained in received standard flow records;
  ii. an enhanced flow reporting engine coupled to graphical user interface (gui) for providing user selectable reporting criteria;
  iii. an encoding and distribution engine for encoding the received standard flow records with the identified map domain information; and
  iv. a distribution list database for identifying entries that will received the encoded flow records;
 wherein the one or more network monitoring devices are configured and operable to:
  receive a flow record, the flow record including initial network flow information in a flow record format comprising at least a source address and a destination address;
  retrieve domain name information associated with each of the source address and destination address from the database;
  retrieving information responsive to the user selected set of flow criteria including identifying network traffic growth of at least one identified domain over a specified time period;
  encode the domain name information and retrieved information responsive to the selected set of flow criteria in the received flow record while maintaining the initial network flow information to yield an enhanced flow record.

11. The monitoring system as recited in claim 10, wherein the enhanced flow record is a flow record following customized Netflow format.

12. The monitoring system as recited in claim 10, further comprising a user interface communicatively coupled to the one or more monitoring devices, the user interface configured to obtain traffic analysis criteria from a user.

13. The monitoring system as recited in claim 12, wherein the domain name information includes a domain name suffix string and wherein the one or more network monitoring devices configured and operable to retrieve the domain name information are further configured and operable to filter the retrieved domain name information based on one or more domain name suffix strings.

14. The monitoring system as recited in claim 13, wherein the one or more network monitoring devices are further configured and operable to analyze a plurality of the enhanced flow records stored in the flow record repository according to the traffic analysis criteria.

15. The monitoring system as recited in claim 10, wherein the one or more network monitoring devices are further configured and operable to analyze a plurality of the enhanced flow records stored in the flow record repository to identify one or more domain names associated with sources of network traffic growth.

16. The monitoring system as recited in claim 14, wherein the traffic analysis criteria is associated with a user-specified collection of network resources or services.

17. The monitoring system as recited in claim 10, wherein the one or more network monitoring devices are further configured and operable to periodically distribute an annotated flow template defining a plurality of fields comprising the enhanced flow record.

18. The monitoring system as recited in claim 14, wherein the one or more network monitoring devices configured and operable to analyze the plurality of the enhanced flow records are further configured and operable to aggregate two or more of the enhanced flow records based on one or more domain name suffix strings.

\* \* \* \* \*